Sept. 5, 1967  R. F. FARNUM  3,339,349
COALESCER
Filed Aug. 28, 1964

INVENTOR
ROBERT F. FARNUM
BY Norman Friedland
ATTORNEY

United States Patent Office 3,339,349
Patented Sept. 5, 1967

3,339,349
COALESCER
Robert F. Farnum, Tariffville, Conn., assignor to United Aircraft Corporation, East Hartford, Conn., a corporation of Delaware
Filed Aug. 28, 1964, Ser. No. 392,748
1 Claim. (Cl. 55—309)

This invention relates to water separators and constitutes an improvement over the water separator described and claimed in U.S. Patent No. 2,835,340, granted to McGuff et al. on May 20, 1958.

In an air conditioning system utilized for controlling the environment within an aircraft and particularly of the air cycle type, bleed air taken from the power plant in normal practice is passed through a refrigeration unit such as a turbine-fan assembly and then directed to the compartment or the cabin intended to be cooled for maintaining proper environmental conditions. In these types of systems, particularly where the air evidences an adiabatic expansion in driving the turbines, the partial pressure of the moisture which is contained in the air stream decreases such that the moisture is separated from or carried with the air stream in the form of fog or mist consisting of many fine particles of moisture. Unless the moisture is removed from the air stream, these particles will discharge into the cabin creating a foggy or misty atmosphere, or on occasions these particles could freeze into ice which would be carried into the cabin. To eliminate this undesirable condition, it is a well-known expedient to provide a suitable water or moisture separator. Since the water separator is the primary concern of this invention, for convenience the details of a suitable air conditioning system have been eliminated. However, for further details of a suitable system, reference should be made to U.S. Patent No. 2,835,340 supra.

An object of this invention is to provide a coalescer for a water separator which is mounted normal to the flow of the air passing therethrough.

A still further object of this invention is to provide a disc-type coalescer for a water separator mounted perpendicular to the air stream and characterized by being relatively simple to manufacture, economical to make, readily removable and one that improves the efficiency of coalescing and hence, the overall efficiency of the water separator.

Other features and advantages will be apparent from the specification and claim and from the accompanying drawings which illustrate an embodiment of the invention.

Figure 1:
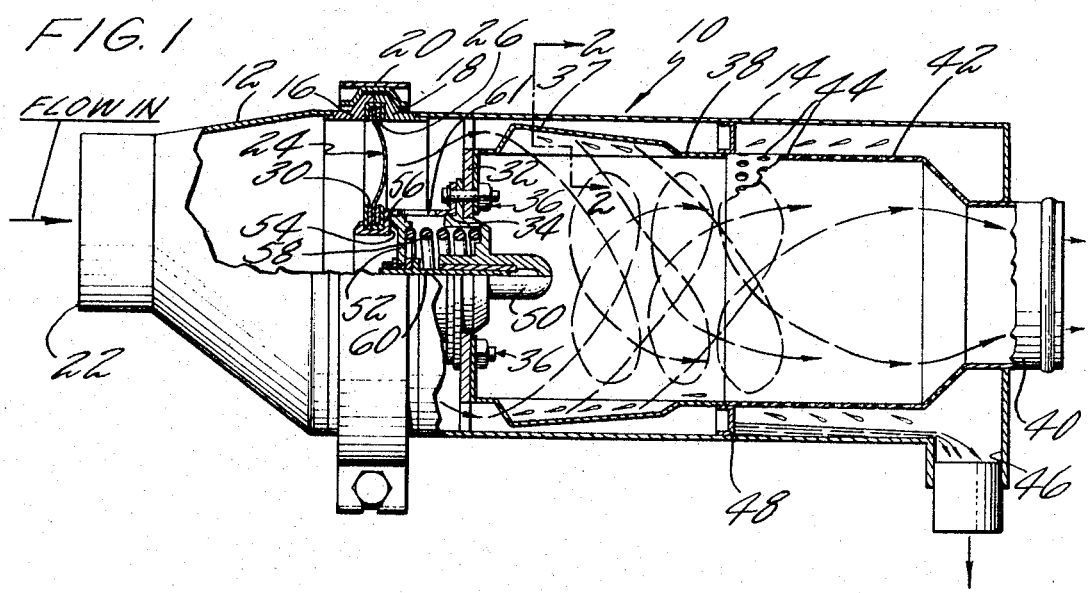
FIG. 1 is a side elevation partly in section of the assembled water separator.
Figure 2:
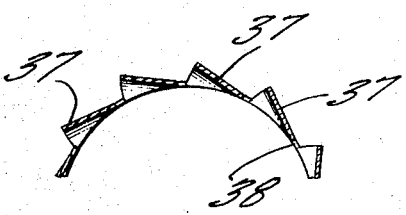
FIG. 2 is a partial section taken along lines 2—2 of FIG. 1.
Figure 3:
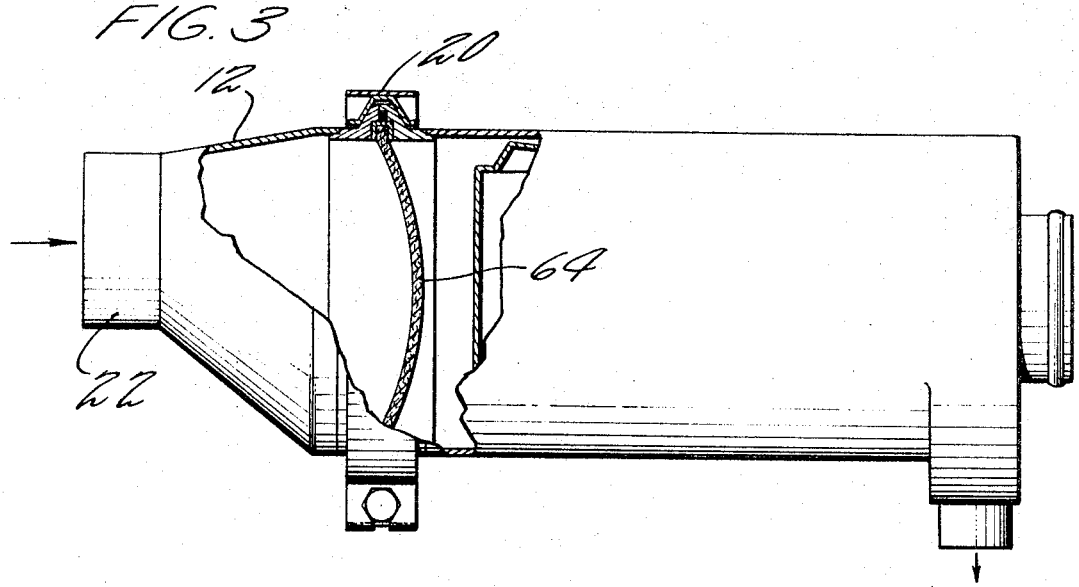
FIG. 3 is a side elevation partly in section illustrating a modified version of this invention.

Referring now particularly to FIGS. 1 and 2, the water separator generally illustrated by numeral 10 comprises a forward mounted casing member 12 and a rearward mounted casing member 14, each carrying at their ends suitable flanges 16 and 18 adapted to engage each other for defining a housing for the assembled water separator. Suitable clamp means 20 engaging the flanges 16 and 18 rigidly secure and hold the casing members 12 and 14 in place. An inlet 22 is provided in the casing member 12 and is adapted to receive suitable ducting (not shown) for admitting air into the water separator which air contains entrained moisture particles as was explained above. Air admitted into the water separator is then directed over the coalescer generally indicated by numeral 24 or 64. The coalescer, which may be made from a suitable woven, knitted or matted fabric, is preformed in the shape of a disc, either solid as shown in FIGURE 3 or with a suitable hole as shown in FIGURE 1, and is supported at its outer periphery by a ring clamp generally illustrated by numeral 26. The inner periphery of the coalescer disc is secured to the ring clamp member generally indicated by numeral 30. The ring clamp 30 is secured to bulkhead 32 which has one end suitably connected to the inside wall of casing 14 by annular support member 34. Member 34 is, in turn, secured to bulkhead by suitable nut and bolt assemblies indicated generally by numeral 36.

Apertures formed in the bulkhead direct the air discharging from the coalescer to swirl vanes 37 which are formed in the vortex generator mechanism generally indicated by numeral 38. These vanes may be stamped out of the cylindrically shaped vortex generator casing 38 and are adapted to impart a swirling movement of the air impinging thereagainst. The material removed to form the vanes form openings in the body of 38 for admitting air internally thereof. The direction of the air is changed wherein a swirling motion is imparted thereto as illustrated in FIG. 1, and then discharged out of centrally disposed outlet duct 40. As noted from the drawing, the plurality of vanes disposed about the circumference extend outwardly from the cylindrical body 38 and taper inwardly toward the longitudinal axis. By virtue of this arrangement, the vanes tend to collect the droplets impinging thereon, which droplets adhere to the inner wall of 38 and migrate to the collector section.

The collector section of the water separator comprises a generally cylindrically shaped tube 42 having a plurality of small apertures 44 which serve to permit the droplets being centrifuged by virtue of the swirling air to migrate toward the inner wall of casing 14. Here the droplets by virtue of gravity fall to the bottom where they are, in turn, collected and dumped out of the separator through opening 46. The collector section at a point toward the outlet receiving section 40 is faired inwardly toward the axis of rotation and joins the outlet duct 40 which is formed concentric with the collector tube. It has been found that by adding this faired portion to the collector section and reducing the diameter of the outlet duct so that the ratio of diameters is approximately 6 to 5, the overall efficiency of the water separator is greatly increased.

In the event that the coalescer 24 becomes clogged, a bypass valve generally indicated by numeral 50 can be provided. Bypass valve, if used, may comprise annular support member 34 which is secured to bulkhead 32 as was noted above.

A spring bias valve disc 52 is urged against seat 54 formed on an inwardly projecting flange 56 of support member 34. Spring 58 acts against the rear seat of valve disc 52 urging it in the closed position. The inner diameter of valve disc 52 is slidably mounted on fixed shaft 60 and moves rightwardly when the pressure acting on the face of valve disc 52 exceeds the force created by spring 58. When the valve opens, flow admitted internally of the water separator is directed to bypass coalescer 34, passes through slots 61 (only one being shown) formed in member 34 and then to the turning vanes 37 by way of the aperture formed in bulkhead 32.

As was pointed out above, the coalescer is formed from a suitable material, as for example the material disclosed in U.S. application Ser. No. 71,605, filed on Nov. 25 1960, and assigned to the same assignee and serves to agglomerate the fine mist particles to physically change their size so as to be heavy enough to be centrifuged by the vortex generator. While in the art coalescing material has been mounted concentric to the longitudinal axis or parallel thereto, it has been found that the effectiveness of the coalescer is increased by mounting it perpendicular to the air stream and the longitudinal axis of and spaced away or apart from the vortex generator of the water separator.

It may be desirable from a structural standpoint to shape the coalescer disc so that it will bulge somewhat as shown in FIGS. 1 and 3. It is to be realized that such a construction is for the purpose of this invention considered to mean that the coalescer is mounted substantially perpendicular to the longitudinal axis.

FIG. 3 shows another version of this invention where the bypass valve has been eliminated and the coalescer 64 is similar to coalescer 24 of FIG. 1 but is made in the form of a circular disc.

Inasmuch as the construction of the water separator in FIG. 3 is substantially identical to the construction of the one illustrated in FIG. 1, a description thereof is omitted for convenience. It will be noted, however, that the end wall at the inlet of the vortex generator is solid so that the moisture laden air is directed to the swirl vanes.

It should be understood that the invention is not limited to the particular embodiments shown and described herein, but that various changes and modifications may be made without departing from the spirit or scope of this novel concept as defined by the following claim.

I claim:

In apparatus for removing particles of liquid entrained in a stream of gaseous fluid, the combination of: a generally cylindrically-shaped housing adapted to be disposed in a fluid line, said housing having an inlet for admitting the moisture-laden fluid, a vortex generator having a cylindrically-shaped wall having inwardly directing swirl vanes formed thereon, a cylindrically-shaped centrifugal collector section disposed downstream of said vortex generator, means for securing said collector section and vortex generator to said housing so that said collector section and vortex generator are in axial alignment, an outlet in said housing formed adjacent to and in axial alignment with the substantially moisture-free fluid discharge end of said collector section, a coalescer formed from a relatively thin sheet of fabric shaped in the form of a disc having a central opening and mounted upstream of and spaced relative to the receiving end of said vortex generator, said coalescer being secured at its outer circumference to said housing and extending inwardly so that it lies perpendicular to the fluid stream, bypass valve means centrally mounted on the receiving end of the vortex generator, supporting means including an element extending from the inner surface of said housing toward the centerline thereof to support said bypass valve means and vortex generator internally of said housing, said suporting means also securing the inner peripheral edge of said coalescer thereto, drain means for removal of moisture from said collector section, said bypass valve means including an inlet communicating with the inlet of said housing and an outlet communicating wtih said vortex generator, a normally closed valve element in said bypass valve means resiliently urged in the closed direction, said normally closed valve automatically opens when the pressure in said valve inlet exceeds a predetermined value to bypass the coalescer so as to lead said gaseous fluid through an opening formed at the outer edge of said element adjacent the inner surface of said housing into said vortex generator.

References Cited

UNITED STATES PATENTS

| | | | |
|---|---|---|---|
| 1,923,515 | 8/1933 | Stull | 55—455 X |
| 2,233,079 | 2/1941 | Hawley | 55—455 |
| 2,425,588 | 8/1947 | Alexander | 55—452 |
| 2,709,501 | 5/1955 | Toth et al. | 55—455 X |
| 2,792,075 | 5/1957 | McBride et al. | 55—321 |
| 2,823,760 | 2/1958 | Andersen. | |
| 2,921,646 | 1/1960 | Poole. | |
| 3,251,176 | 5/1966 | Gleason | 55—452 |

FOREIGN PATENTS

| | | |
|---|---|---|
| 800,932 | 9/1958 | Great Britain. |
| 960,504 | 6/1964 | Great Britain. |

HARRY B. THORNTON, *Primary Examiner.*

FRANK W. LUTTER, *Examiner.*

S. W. SOKOLOFF, *Assistant Examiner.*